United States Patent [19]

Resler, Jr.

[11] 4,104,989

[45] Aug. 8, 1978

[54] STRATIFIED CHARGE

[75] Inventor: Edwin L. Resler, Jr., Ithaca, N.Y.

[73] Assignee: Cornell Research Foundation, Inc., Ithaca, N.Y.

[21] Appl. No.: 610,420

[22] Filed: Sep. 4, 1975

Related U.S. Application Data

[63] Continuation-in-part of Ser. No. 472,361, May 22, 1974, abandoned.

[51] Int. Cl.² ............... F02B 19/10; F02B 19/16
[52] U.S. Cl. ..................... 123/32 ST; 123/26; 123/119 D; 123/75 B
[58] Field of Search ....... 123/119 D, 119 DB, 124 R, 123/32 ST, 26

[56] References Cited

U.S. PATENT DOCUMENTS

| | | | |
|---|---|---|---|
| 1,050,200 | 1/1913 | Aubery | 123/124 |
| 1,945,603 | 2/1934 | Funston | 123/119 D |
| 1,955,661 | 4/1934 | Waldo | 123/119 D |
| 3,023,745 | 3/1962 | Barnes | 123/119 D |
| 3,024,776 | 3/1962 | Skirvin | 123/119 D |
| 3,413,803 | 12/1968 | Rosenlund | 60/282 |
| 3,810,454 | 5/1974 | Hunt | 123/142 |
| 3,921,395 | 11/1975 | Kawata | 60/282 |
| 3,921,397 | 11/1975 | Maldonado | 60/282 |

*Primary Examiner*—Ronald B. Cox

[57] ABSTRACT

A low pollution internal combustion engine is disclosed in which a first portion of a stratified charge is initially preformed in the part of the manifold which supplies the first charge portion to the cylinder, said first charge portion being pre-formed when the intake valve for the cylinder is in the closed condition, and subsequently being introduced, together with the remaining portion of the stratified charge, when the intake valve is opened during the intake stroke of the engine.

6 Claims, 7 Drawing Figures

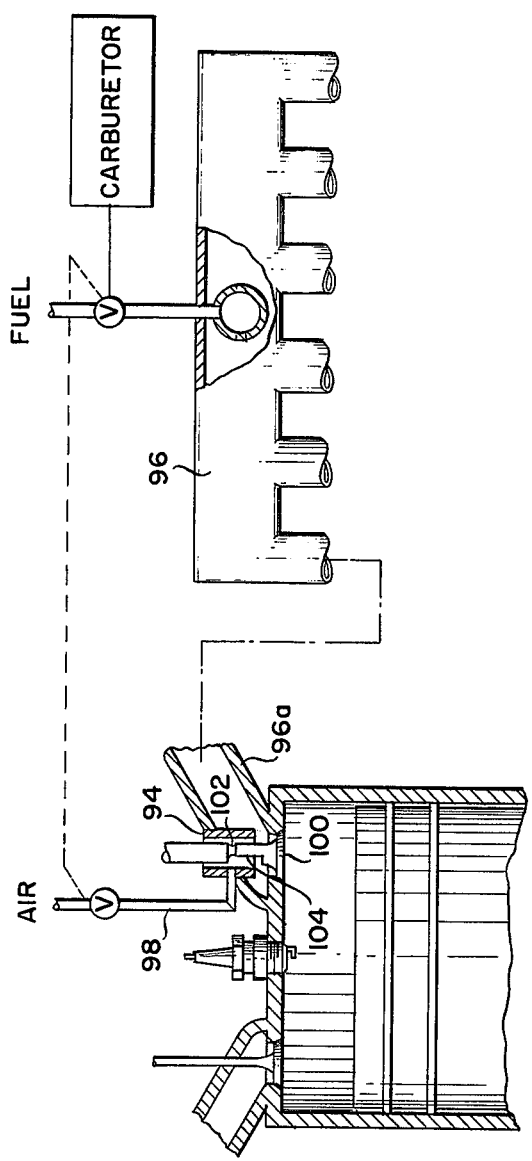
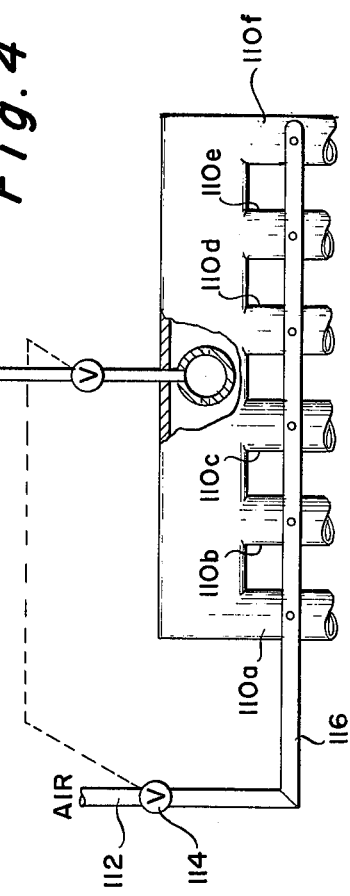
Fig. 3
Fig. 4

STRATIFIED CHARGE

BACKGROUND OF THE INVENTION

This application is a continuation-in-part of earlier application, Ser. No. 472,361, filed May 22, 1974, Edwin L. Resler, Jr., Inventor, same assignee, now abandoned.

$NO_x$ can be controlled by minimizing its formation and/or causing it to chemically react with chemicals to produce less objectionable compounds and elements. The formation of $NO_x$ is primarily determined by oxygen availability, peak temperature and residence time at high temperatures.

With a homogeneous charge of air/fuel one can minimize formation of $NO_x$ by causing combustion under oxygen starved conditions but under those conditions objectionable amounts of CO and HC are produced and so steps should be taken to minimize those compounds in an efficient manner (see U.S. Pat. No. 3,877,229 issued to the instant inventor).

With a homogeneous charge at or near stoichiometric little can be done with peak temperature and residence time at high temperature as a means to minimize formation of $NO_x$ so one is forced to cause the $NO_x$ to be reacted with other chemicals for minimizing the objectionable compound. One manner for producing such $NO_x$ reaction is the well known catalytic exhaust reactor and another manner for causing $NO_x$ reaction is by mixing the $NO_x$ with HC under proper temperature and oxygen starved conditions as described in copending application Ser. No. 449,391 filed Mar. 8, 1974 by the instant inventor. When employing a homogeneous charge of air/fuel at or near stoichiometric, regardless of which manner of $NO_x$ reaction is employed, one must take additional steps to minimize HC and CO as exhaust pollutants.

Although significant results in the reduction of $NO_x$, HC and CO exhaust pollutants have been achieved in engines having homogeneous charge of air/fuel at or near stoichiometric, it appears that the goals for pollution control will be extremely difficult, if not impossible, to achieve. Therefore, substantial interest has been recently shown in the use of stratified charge as a means for pollution control.

Many approaches which have been taken for creating stratified charge have been referred to as "prechamber stratified charge engines". A recent review of many of those approaches will be found in the publication entitled "Evaluation of Prechamber Spark Ignition Engine Concepts" by the Office of Research and Development, U.S. Environmental Protection Agency, Washington, D.C., dated February 1975 (EPA - 650/2-75-D23). Another group of prior approaches for creating stratified charge employs introducing a relatively fuel-lean air/fuel mixture by way of the conventional carburetor-manifold as the main cylinder charge and introducing fuel or a relatively fuel-rich air/fuel mixture in such a manner as to create a readily ignitable layer at or near the spark plug. Examples of such systems are presented in U.S. Pat. Nos. 3,504,681 to H. Winkler; 2,121,921 to M. Mallory; 2,242,990 to T. E. Brown; 3,238,930 to E. A. VonSeggern et al; 3,270,721 to L. Hideg, et al; 3,315,650 to I. N. Bishop et al; and 3,318,292 to L. Hideg. Still another group of prior approaches for creating stratified charge employs the conventional carburetor system to introduce a stoichiometric air/fuel mixture to the combustion chamber and employs a source of air or relatively fuel-lean air/fuel mixture which is positioned in the area immediately above the piston in the combustion chamber. Examples of such systems are U.S. Pat. Nos. 3,170,445 to Folcke; 3,364,911 to Baudry et al; and 1,505,697 to Campbell.

Since all of those previous approaches involve the creation of the stratified charge within the combustion chamber rather than pre-forming some or all of the charge prior to delivery to the combustion chamber, they involve complex controls, and require design and manufacturing changes to the engine which are costly.

It should also be noted that in prior approaches to stratified charge, the charge is relatively fuel rich or stoichiometric in the vicinity of the spark plug and relatively fuel lean in the vicinity of the piston. With such a form of stratified charge, one can adjust the air/fuel mixture and total quantity of each of the two parts of the charge to minimize the formation of $NO_x$ and CO, however when such is done, there is a probability that the exhaust will contain excess amount of HC under such operating conditions as idle, deceleration, acceleration, and/or cold start.

SUMMARY OF THE INVENTION

In accordance with the principles of this invention the intake manifold is provided with a source of air which is so positioned and proportioned that while the intake valve of the cylinder is closed, air is introduced into the manifold in such a manner as to create within the manifold a pocket of relatively fuel-lean fuel/air mixture.

An object of the invention is to provide a simple but effective means to produce a stratified charge for an internal combustion engine.

Another object of the invention is to provide an internal combustion engine with a manifold having an air intake which creates a pocket of relatively fuel-lean fuel/air mixture between the cylinder intake valve and the carburetor and thereby pre-form all or a portion of a stratified charge.

Still another object of the present invention is to provide an improved internal combustion engine including means for forming in portions of the intake manifold adjacent each intake valve which is in a closed condition a predetermined quantity of pre-stratified air or leaned out fuel mixture the volume of which is less than the displacement of the cylinder. Consequently, when the intake valve is subsequently opened, the quantity of air or leaned out fuel/air mixture partially fills the cylinder during the suction stroke to define a layer of air or lean mixture adjacent the piston, the remaining portion of the cylinder adjacent the spark plug being filled with a more concentrated layer of the carbureted fuel/air mixture.

In one embodiment of the invention, the means for forming the quantity of air in the intake manifold comprises an air conduit which is in communication at one end with atmosphere and which terminates at its other end adjacent the intake valve and which is operable so that a substantial portion of the associated intake manifold is filled with air while the intake valve is closed. In another of several embodiments, the air contained in the fumes from the valve rocker arm chamber above the valves or another source of air is conveyed to the intake manifold via a throttle valve means and diverter means which guide the fumes or air to various associated portions of the intake manifold to provide pre-stratification adjacent the closed intake valve. Exhaust manifold means are provided for "folding back" the exhaust gases upon themselves so that the subsequently emitted relatively lean fuel/air gases are mixed with the initially emitted combustion gases to reduce the carbon monoxide and unburnt hydrocarbon pollutants.

In accordance with a more specific object of the invention, the means for supplying the air or the fumes to the intake manifold includes an air throttle valve which is operated simultaneously with, and in the same sense of operation as, the carburetor throttle valve, whereby the quantity of the pre-stratifying air in the intake manifold is varied as a function of engine speed. Metering restriction means may be provided for balancing or individually tuning the quantities of air or fumes that are precharged in the associated portion of the intake manifold and are subsequently drawn by suction into the cylinders, respectively.

In accordance with a further object of the invention, shutoff valve means may be provided for temporarily interrupting the flow of air through the air conduit when the intake valve is open to prevent unwanted dilution of the carbureted fuel/air mixture when desirable.

Other objects and advantages of the invention will become apparent from a study of the following specification when viewed in the light of the accompanying drawings, in which:

FIG. 3 is a partly diagrammatic detailed sectional view of a modification of the embodiment of FIG. 1 wherein the air supply conduit is closed when the intake valve is in the open condition;

FIG. 4 illustrates diagrammatically a further embodiment of the invention;

DESCRIPTION OF THE PREFERRED EMBODIMENT

Figure 1:
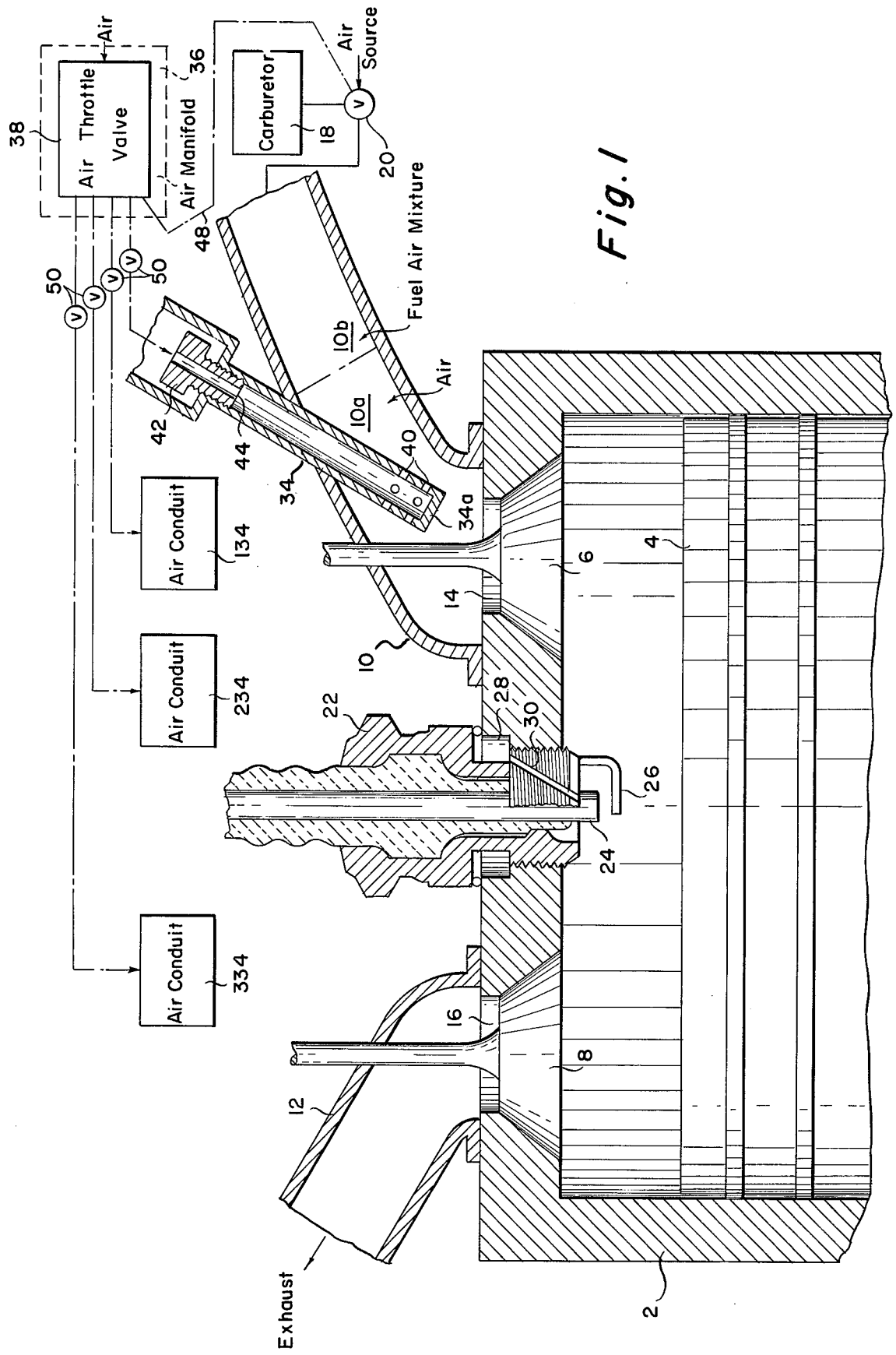
FIG. 1 is a partly diagrammatic detailed sectional view of the first embodiment of the invention wherein the air conduit terminates in the intake manifold adjacent the intake valve.

As is known in the art, the operation of an internal combustion engine in the stratified charge mode effects a material reduction in the oxides of nitrogen, unburned hydrocarbons, and carbon monoxide pollutants in the exhaust gases. An internal combustion engine operating on the Otto Cycle has an efficiency which depends only on the compression ratio ($\eta = 1 - (1/r\gamma - 1)$) where $\gamma$ equals the ratio of the specific heats $c_p/c_v$. The work, W, per pound of air cycled, is the efficiency times the heat added, Q. For a given RPM (road speed), the amount of air passing through the engine, M, is proportional to the manifold pressure, MP. To compare the standard with the stratified cycle, equate the powers P. Since the efficienceies are equal, the heat added must be the same. Since only part of the charge in the stratified engine has fuel and the carburetor provides the same air/fuel ratio to the part of the charge with fuel, the manifold pressure is higher in the stratified charge case. Since for stratification, the manifold pressure, MP, increases, the heat added per pound of air is less and the maximum temperature is also less since it is proportional to the head added per pound of air. This reduction in temperature is extremely effective in reducing nitric oxides. For example, an increase of manifold pressure by 30% can reduce the maximum temperature by 1000° K and nitric oxide concentration by a factor greater than 10.

This large reduction in NO concentration is due to two effects, (1) the lower temperature implying a lower equilibrium value and probably more importantly, (2) a large reduction in formation time. The effects of time on NO formation has recently been reported by Komiyama and Heywood, ASE, May 1973, 730475.

By analyzing the exhaust products from the engine one usually infers an average air/fuel ratio in the engine. The air/fuel ratio so defined for the stratified cycle is the air/fuel ratio of the standard engine times the increased flow rate of air. The overall air/fuel ratio is thus equal to the air/fuel ratio of the standard engine times the ratio of the manifold pressure of the standard engine to that of the stratified engine. For a 30% change in manifold pressure due to stratification, the air/fuel ratio increases by 1.30. If the engine was operating at an air/fuel ration of 15, the apparent air/fuel ration for the same power with stratification is about 19 or 20. These overall lean mixtures would not ignite or burn if stratification was not present in the engine.

Since stratification reduce the pumping losses of the engine, this can produce a significant fuel saving at low speeds, for example, below 30 mph.

Adding air to the portion of the intake manifold of an internal combustion engine while it is associated with an intake valve in a closed condition should not be confused with the teachings of numerous patentees and technical commentators in the field where air has been added to the intake manifold or the combustion chamber to dilute the fuel/air mixture when that mixture was inappropriate to the loading condition of the engine (such as during deceleration, idle, etc.). Such prior art is exemplified by the use of an additional air source or plural air sources in the intake manifold below the main throttle valve in the path of the primary fuel/air mixture from the carburetor to uniformly dilute the mixture or accomplish a more uniform fuel/air distribution to plural cylinders fed by a single carburetor.

Meyer U.S. Pat. No. 1,969,814 is an example of air dilution to accomplish a uniform mixture under several engine load conditions. August U.S. Pat. No. 3,561,409 is an example of dilution to handle the fuel accumulation in the intake manifold responsible for hydrocarbon pollution during deceleration.

Other related teachings are set forth in U.S. Pat. Nos. to: Galic 3,186,390; Tatsutomi, et al 3,782,346; Serruys 3,494,341; Doering 1,998,494; Linn 3,156,225; Serruys 3,190,275; von Seggern, et al 3,470,855; Masaki, et al 3,533,386; Garcea 3,664,316; Baudry 3,688,752; Briggs 3,568,437; Loebs 2,157,551; Masaki 3,590,793; Fonseca, et al 3,756,271; Roberts 2,884,954; Bendel 3,110,295; and Dubina 1,916,257.

By way of distinction the teachings of the present invention use an additional air source or plural air sources to precharge the fuel/air mixture in the portion of the intake manifold uniquely associated with a closed intake valve with a structured fuel/air ratio layer. Such layer stratification is usable in accordance with the teachings of the present invention under all engine operating conditions including idle and deceleration.

Referring now to FIG. 1, the internal combustion engine includes a plurality of cylinders 2 (only one of which has been illustrated) in each of which is reciprocably mounted a piston 4. Associated with each cylinder are conventional intake and exhaust valves 6 and 8, respectively, and intake and exhaust manifolds 10 and 12 which communicate at one end with the intake and exhaust ports 14 and 16, respectively. The intake manifold is connected at its other end with a carburetor 18 for supplying the fuel/air mixture to the cylinder via throttle valve 20. Although throttle valve 20 is shown herein as a part of the intake manifold, it should be recognized that such throttle valves are normally a part of the carburetor and serve a plurality of cylinders. In practicing the present invention, the throttle valve 20 would probably be a part of the carburetor structure. Connected with the cylinder is a spark plug 22 having electrodes 24 and 26 for igniting the fuel/air mixture that is supplied to the cylinder via the intake valve 6. In the illustrated embodiment, the spark plug 22 is of the type illustrated in the Resler application Ser. No. 449,391 filed Mar. 8, 1974 and characterized by the provision of means defining a storage chamber 28 for unburnt hydrocarbons and generally longitudinally extending channel means 30 formed in the screw thread portion of the plug for providing constant communication between the storage chamber and the cylinder.

In accordance with the present invention, means including an air conduit 34 are provided for introducing — when the intake valve is closed — a predetermined quantity of pre-stratifying air into that portion 10a of intake manifold 10 which is adjacent the intake valve. At one end the air conduit is connected with atmosphere via air manifold 36 and air throttle valve 38. At its other end adjacent the intake valve the air conduit is closed by a transverse wall 34a, a plurality of apertures 40 being contained in the adjoining wall portion of the air conduit for forming a radially outwardly directed circular pattern, whereby the protective oil film layer on the intake valve is not disturbed. Intermediate its ends, the air conduit contains removable metering orifice means 42 containing an orifice passage 44 of predetermined size which is a function of the size and location of the cylinder 2 relative to the carburetor. The air manifold includes a plurality of outlets connected with similar air conduits 134, 234 and 334 for supplying air in a similar manner to portions of the intake manifold associated with the remaining cylinders of the engine respectively.

In accordance with a characterizing feature of the present invention, the relative pressure difference between the atmospheric air and the fuel/air mixture is so controlled relative to the dimensions of the intake manifold that the air quantity 10a formed in the inlet manifold is less than the displacement of the cylinder 2, whereby when the inlet valve is open and the piston 4 completes its suction stroke, the quantity of air (or leaned out mixture) will partially fill the chamber to a desired level above the piston, the remaining portion of the cylinder adjacent the spark plug being filled with the fuel/air mixture 10b supplied by the carburetor. To this end, the replaceable metering orifice 42 is selected to have a size which "tunes" the intake manifold portion to the associated cylinder. Furthermore, the air throttle valve 38 is mechanically connected with the throttle valve 20 by suitable linkage means 48 to control the amount of air introduced into the intake manifold so as to achieve the desired stratification in the manifold for introduction into the cylinder during the intake stroke. More particularly, the air throttle valve 38 is biased to a slightly more open condition relative to the throttle valve 20 so that the air has a greater pressure than the fuel/air mixture when the intake valve is closed. Thus, when the intake valve 6 is closed, the air 10a in the intake manifold will force the fuel/air mixture in the reverse direction in the intake manifold. In the illustrated embodiment the aforementioned predetermined quantity of air 10a has a smaller volume than the volume of the intake manifold contained between the fuel/air throttle valve 20 and the intake valve, and consequently the fuel/air mixture portion 10b is formed between the air portion 10a and the throttle valve. The volume of the intake manifold between the intake valve and the throttle must be sufficient to accommodate the volume of the predetermined quantity of air. In the case where the volume equals the predetermined quantity, the air completely fills the space in the intake manifold between the intake valve and the throttle valve. It is apparent that the air conduit 34 may be fashioned or positioned so that any desired stratification distribution is achieved by simple modification apparent to one skilled in the art.

In one mode of operation, when the intake valve 6 is closed, a predetermined quantity of air 10a is formed in the intake manifold 10 adjacent the intake valve, said quantity being a function of the size of the metering orifice 44 and the positions of the air and fuel/air throttle valves. Upon opening of the intake valve, the quantity of air 10a is drawn into the cylinder during the suction stroke to form a rather well-defined layer of air adjacent the piston, the space adjacent the spark plug subsequently being filled by fuel/air mixture 10b supplied by the carburetor. During the compression stroke, the air and the fuel/air mixture are compressed, a portion of the hydrocarbons being supplied to storage chamber 28 via the channel 30. Following ignition, as the piston travels during the power stroke, the hydrocarbons stored in the storage chamber mix with the combustion gases to lower the oxides of nitrogen content thereof (as disclosed in detail in the aforementioned copending Resler patent application Ser. No. 449,391 filed Mar. 8, 1974). Owing to the improved stratified charge effect afforded by the present invention, the engine is permitted to run overall leaner than normal, whereby the predetermined quantity of air 10a in the intake manifold and in the cylinder is somewhat higher than normal, the concentrations of the fuel/air mixture adjacent the spark plug being sufficient to support combustion. Owing to this greater quantity of air in the stratified charge, the carbon monoxide and unburned hydrocarbon components of the exhaust gases are greatly lowered by the air of the pre-stratified charge.

In accordance with a modification of the disclosed invention, shut-off valve means 50 driven by the engine via cam means may be provided for closing the air conduits when the associated intake valves are open, respectively, whereby the carbureted fuel/air mixture is not diluted when the intake valve is open.

Figure 2:
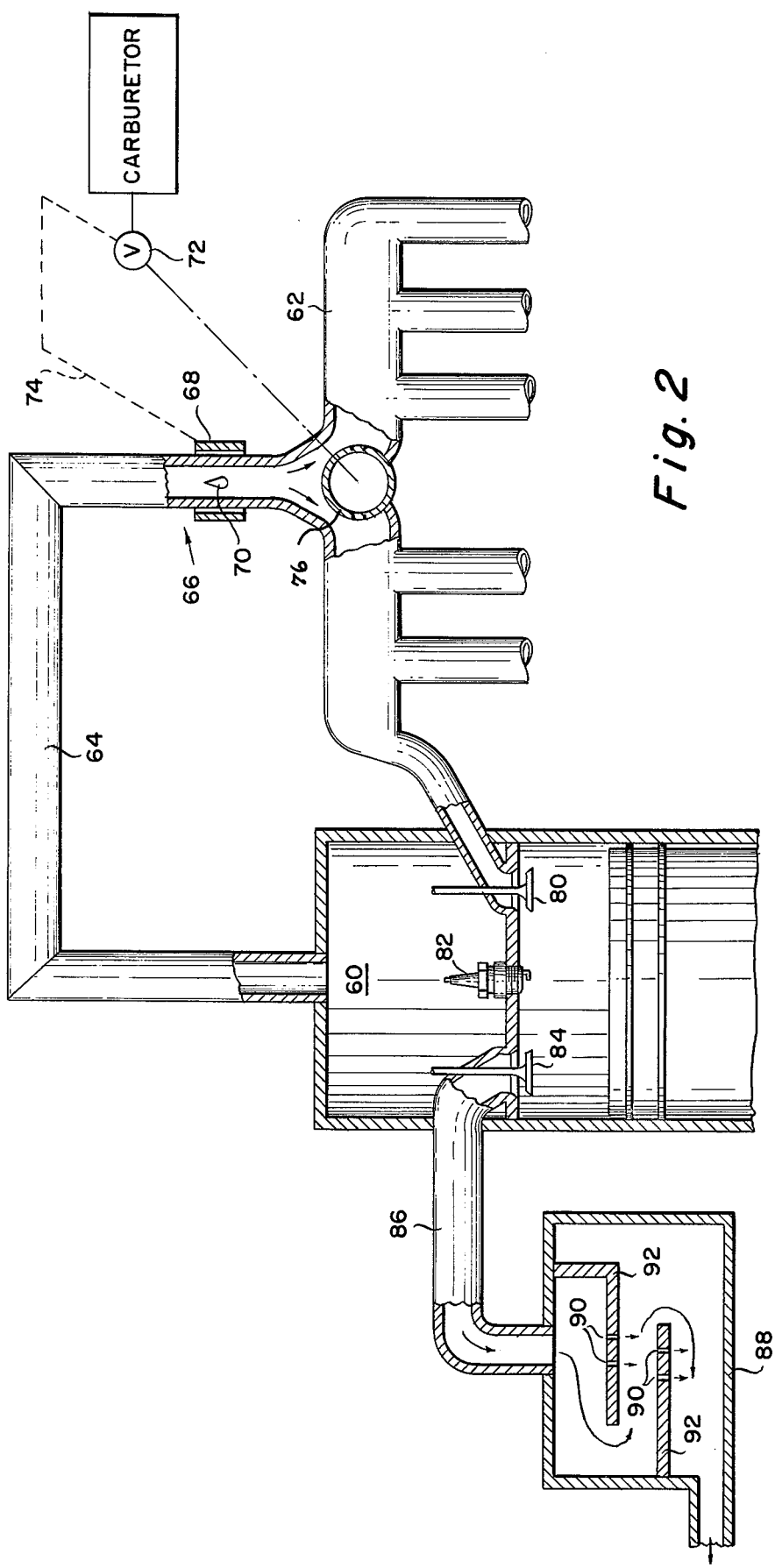
FIG. 2 is a partly diagrammatic detailed sectional view of a second embodiment of the invention wherein the fumes from the valve rocker arm chamber are supplied to the intake manifold to produce the pre-stratifying charge effect.

Referring now to the embodiment of FIG. 2, the fumes contained in the valve rocker arm chamber 60 above the valve stems are supplied to the intake manifold 62 via air conduit 64 that contains air throttle valve 66. More particularly, the air throttle valve means includes a sleeve 68 that is concentrically mounted for sliding movement relative to a tear-drop shaped opening 70 contained in the conduit 64, thereby to vary the supply of air delivered with the fumes to the intake manifold. The air throttle valve is connected for simultaneous movement in the same sense as the carburetor throttle valve 72 via linkage 74. The air and fumes supplied to the intake manifold 62 are diverted to opposite ends 62a, 62b of the intake manifold by the diverter means 76. Consequently, when a cylinder connected with the intake manifold in initially emptied, and air from port 70 is caused to flow into both sections 62a and 62b of the intake manifold. The air supplied to portion 62a dilutes the carbureted fuel/air mixture, while that supplied to portion 62b serves to pre-stratify the charge supplied to the next cylinder that executes its intake stroke, which next cylinder, in accordance with the firing order of the engine, is in communication with the intake manifold portion of 62b. This is repeated for the following cylinder to execute its intake stroke, which cylinder is in communication with intake manifold portion 62a, and so forth.

In accordance with the present invention, the pressure relationships are so designed that for each of those intake valves which is in a closed position at any given time, the adjacent portion of the associated intake manifold is filled with a quantity of air which is less than the displacement of the associated cylinder. Consequently, when the intake valve is subsequently opened, the resultant pre-stratified air or lean mixture is initially introduced into the cylinder, and the undiluted carbureted fuel/air mixture is subsequently introduced into the cylinder. Following closure of the intake valve 80 and ignition of the fuel by spark plug 82, exhaust valve 84 opens to permit exhaust of the combustion gases to atmosphere via conduit 86 and exhaust treating container 88. The exhaust treating container serves to "fold back" the exhaust gases upon themselves, whereby the subsequently emitted relatively lean gases mix with the initially emitted relatively rich combustion gases (via openings 90 contained in passageway defining walls 92) to cause the oxygen contained therein to react with the carbon monoxide and unburnt hydrocarbon components, thereby decreasing these undesirable products.

Referring now to the modification of FIG. 3, means are provided for closing the air supply conduit when the intake valve is in the open condition. To this end, a sleeve 94 mounted concentrically about the intake valve stem is secured to the portion 96a of the intake manifold 96, the air conduit 98 being in communication at one end with an opening contained intermediate the ends of the sleeve. The stem portion of intake valve 100 contains a circumferential groove 102 that communicates with a longitudinally extending slot 104, said groove and slot being so arranged that when the intake valve is in the illustrated closed position, the air conduit communicates directly with the intake manifold portion 96a to supply the pre-stratifying charge thereto, and when the intake valve is open, the air conduit is closed by the valve stem portion above the groove 102.

In the modification of FIG. 4, the pre-stratifying air is supplied at a selected position intermediate the intake valves and the carburetor throttle to the intake manifold portions 110a–110f via the air conduit 112, air throttle valve 114 and the air supply manifold 116. The openings in the air supply manifold may be metered in a graduated manner in accordance with the distance of the manifold portions from the air throttle valve 114 or other distribution constraints. More particularly, by appropriate location of the air supply holes or distribution thereof, any desired pre-stratification in the manifold sections between the inlet valves and the carburetor throttle valves can be achieved.

In FIG. 4, the terminals of the air supply manifold which enter into the intake manifold portions 110a–110f may be shaped to cause the air to jet toward the intake valves thereby forming a layer of fuel lean mixture next to the valves or may be shaped to cause a pocket of lean fuel mixture in the mid portion of manifold arms 110a–110f.

Figure 5:
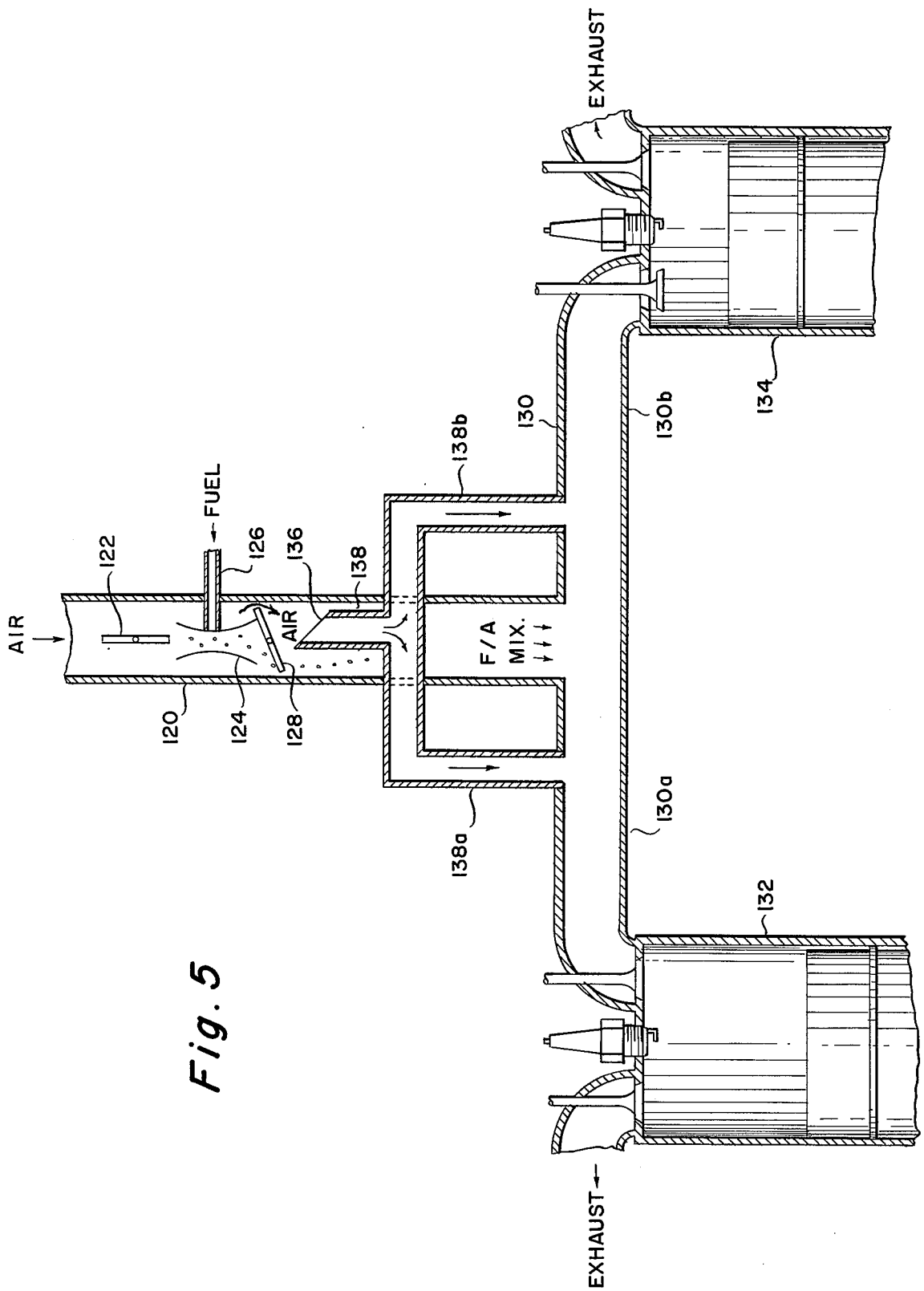
FIG. 5 illustrates still another embodiment of the present invention where the source of air or lean mixture used for precharging the portion of the intake manifold associated with each closed intake valve is a tube immediately below the main throttle plate outside of the fuel droplet path.

Referring now to the embodiment of FIG. 5, air is supplied to the carburetor via air supply conduit 120 containing choke valve 122 and is mixed with the fuel supplied to the venturi 124 via fuel supply conduit 126. Fuel/air mixture containing the fuel droplets is diverted by throttle valve 128 and flows downwardly directly into the intake manifold 130 for distribution to the left and right hand bank cylinders 132 and 134 via manifold portions 130a and 130b, respectively. Air from the air supply conduit 120 enters the orifice 136 which is positioned immediately under the throttle plate 128 in the air manifold 138 for distribution to the intake manifold portions 130a, 130b, via the air distribution manifold portions 138a, 138b, respectively, which terminate in the intake manifold portions 130a, 130b close to the intake valves. Consequently, when the cylinder 134 of the right hand bank executes its intake stroke, the manifold 130 is initially emptied. The vacuum created by the intake stroke withdraws the fuel/air mixture from the carburetor via manifold 130 and also causes air flow through conduits 138a and 138b. The air supplied via air conduit portion 138b dilutes the carbureted fuel/air mixture supplied to cylinder 134, while that supplied via conduit portion 138a pre-stratifies with air the intake manifold section adjacent the intake valve of cylinder 132. When cylinder 132 subsequently executes its intake stroke (in accordance with the firing order of the engine), the pre-stratified charge is initially drawn into the cylinder 132 adjacent the piston face, and the fuel/air mixture is subsequently drawn into the cylinder. The procedure for intake-stroke operation of a right-hand cylinder is repeated as described above. The embodiment of FIG. 5 offers the obvious advantage that the ratio of air to carbureted air/fuel mixture is the same under all engine operating conditions and is determined solely by the relative cross-sectional areas of conduits 138 and 120, respectively. During cold start conditions, the choke valve 122 operates in a normal manner and is not compromised by the pre-stratified charge components. If the supply manifold portions 138a, 138b are terminated at mid points between the intake valves and the throttle valve 128, then the lean fuel mixture layer will form in the intake manifold at those terminations.

Figure 6:
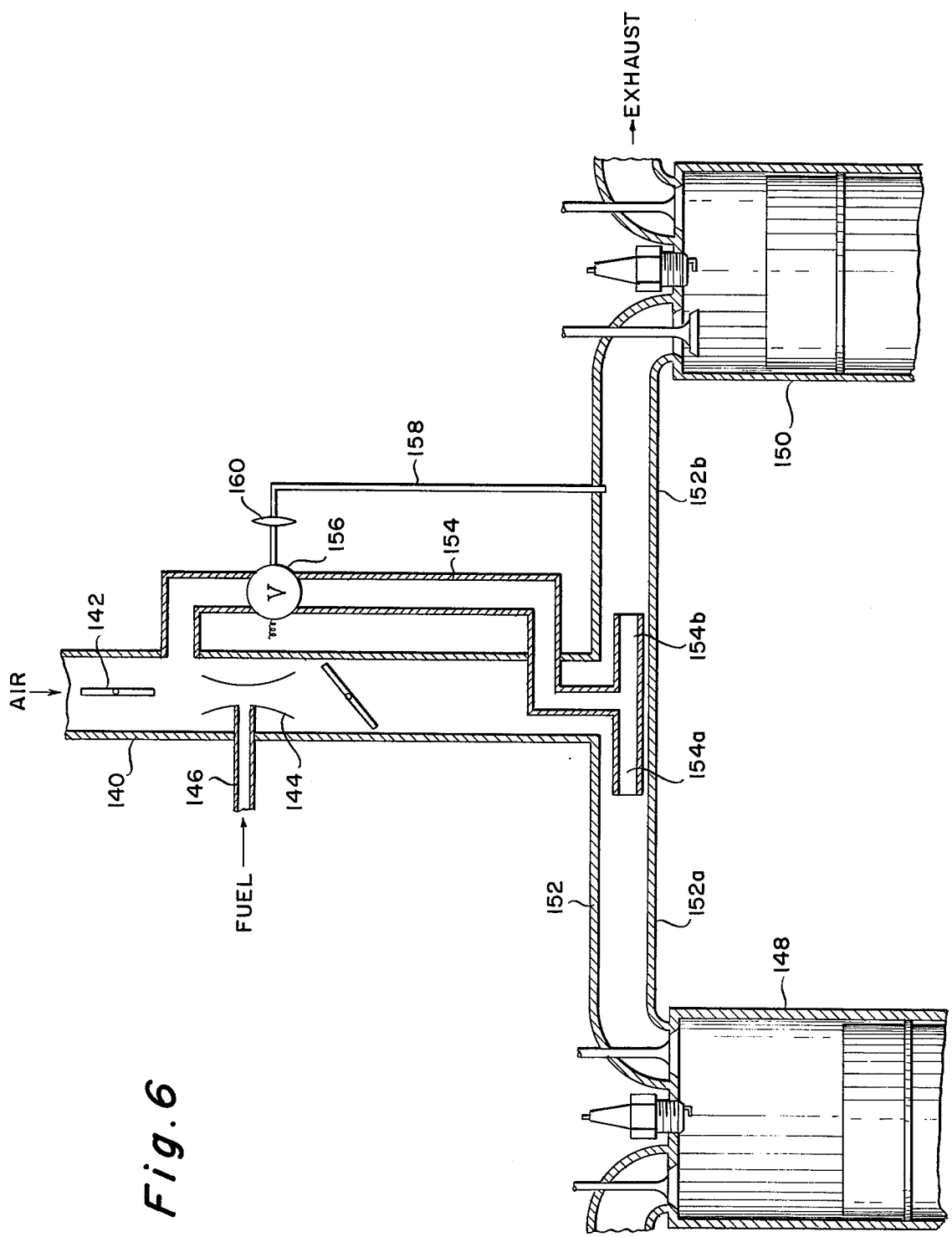
FIG. 6 illustrates still another embodiment of the present invention where the source of air for the air conduit used for precharging the portion of the intake manifold associated with each closed intake valve is a tube immediately below the choke valve and the manifold pressure is used to control a valve in the air conduit.

In the embodiment of FIG. 6, air is supplied to the carburetor via air supply conduit 140 which contains choke valve 142, and is mixed with fuel supplied to venturi 144 via fuel supply conduit 146. The fuel/air mixture is then supplied to the left and right hand bank cylinders 148 and 150 via left and right hand portions 152a and 152b, respectively, of the intake manifold 152. Air from the supply conduit 140 is also supplied to the intake manifold 152 via by-pass conduit 154 which contains a slide valve 156 that is spring-biased to the open condition and is operated toward the closed position by vacuum line 158 and vacuum operator 160 in accordance with the vacuum established in intake manifold 152. The pre-stratifying charge operation of this embodiment is similar to that described above with regard to the embodiment of FIG. 5 but differs in that in FIG. 5 the air supply manifold portions 138a, 138b terminate close to the intake valves whereas the air supply manifold portions 154a, 154b in FIG. 6 terminate at some distance from the intake valves. In both of those embodiments the lean fuel mixture layer is formed adjacent to the intake valve — in FIG. 5 the air enters the intake manifold at low velocity (low pressure differential between input and output of air supply manifold) whereas in FIG. 6 the air enters the intake manifold at high velocity forming a jet that creates the lean mixture layer at the intake valves.

Figure 7:
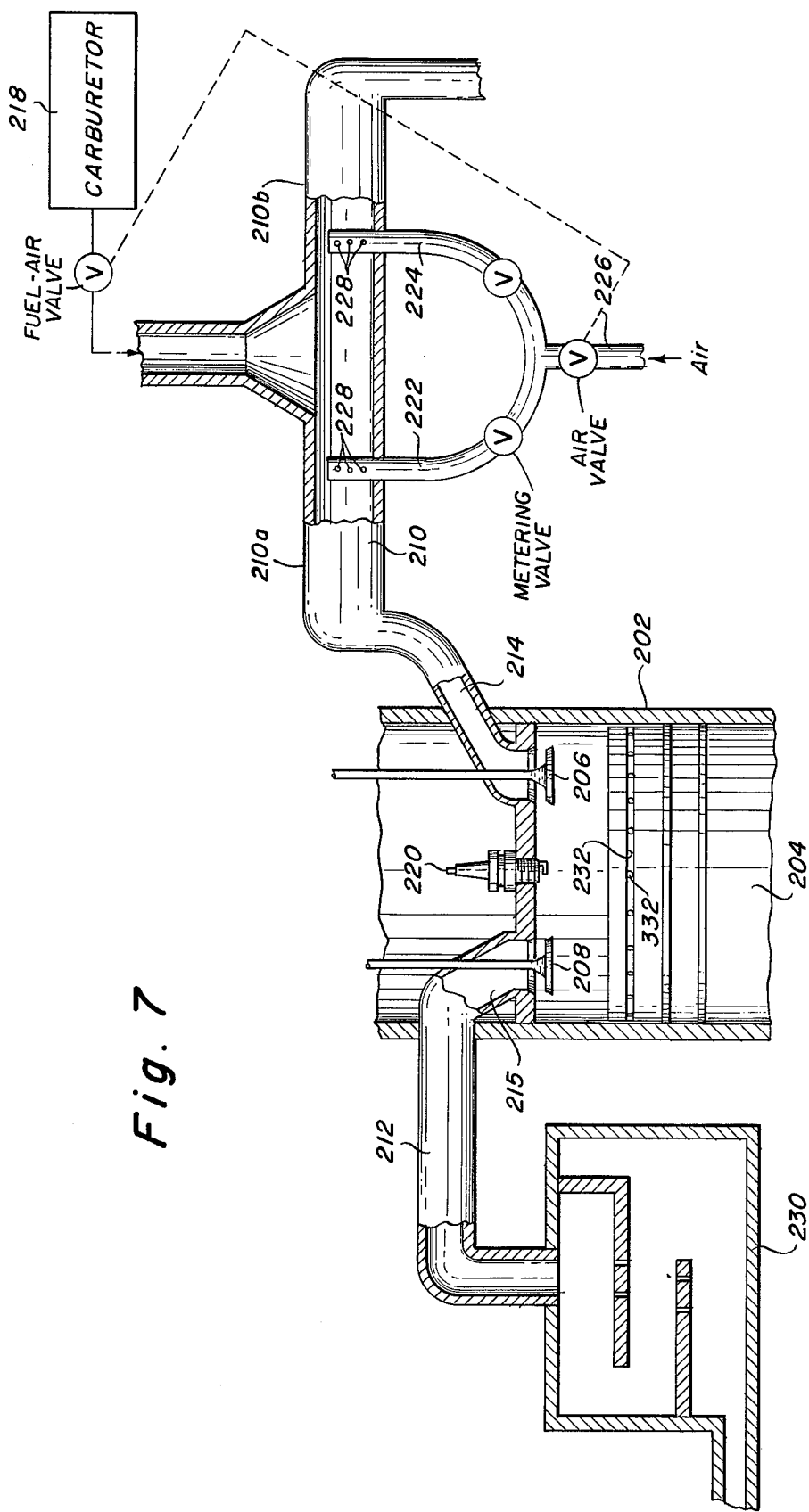
FIG. 7 illustrates yet another embodiment of the invention.

Referring now to FIG. 7, the internal combustion engine includes a plurality of cylinders 202 (only one of which has been illustrated) in which is reciprocably mounted a piston 204. Associated with each cylinder are conventional intake and exhaust valves 206 and 208, respectively, and intake and exhaust manifolds 210 and 212 which communicate at one end with intake and exhaust ports 214 and 215, respectively. The intake manifold is connected with a carburetor 218 for supplying the fuel/air mixture to the cylinder. Connected with the cylinder is a spark plug 220 for igniting the fuel/air mixture that is supplied to the cylinder via intake valve 206. The spark plug 220 is preferably of the type described in Engineering Cornell Quarterly Vol. 8, No. 4. pages 12 and 13, Winter 1974.

In accordance with a characterizing feature of the present invention auxiliary air intake devices 222, 224 located in the branch portions 210a and 210b of the intake manifold 210 between the carburetor 218 and the intake valve 206 cause a curtain of lean fuel/air mixture to be created in the mid portion of each of the branch portions of the manifold.

The auxiliary air intake devices 222, 224 each have a plurality of holes 228 which permit ambient air at 226 to pass through the holes to form a curtain of air in the interior of intake manifold 210. The number and size of holes 228 and their location relative to the passage within the intake manifold are quite critical to the practice of this invention. The holes should be positioned relative to the passage of fuel/air mixture from carburetor 218 through manifold 210 such that the air from those holes will create a pocket or curtain of relatively lean fuel/air mixture in the mid portion of the manifold between the intake valve 206 and the carburetor 218. The holes are positioned so that air passes through the holes transverse to the main passage of fuel/air mixture through the manifold. If the holes are positioned so that air passing through the holes is directed in the same direction as the main passage of fuel/air mixture then there will be a general dilution of all of the fuel/air mixture in the manifold rather than creation of a pocket or curtain of relatively lean fuel/air mixture at a mid point of the charge. The number and size of holes must be sufficient for the volume of air entering at 226 to pass to the interior of the manifold and not in such a manner as to produce dilution of all of the fuel/air mixture in the manifold.

The size of the air opening at 226 determines the volume of the pocket of lean fuel/air mixture created in the mid portion of the manifold and the particular size for a given engine to attain desired pollution control under given operating conditions depends upon many factors such as volume of piston displacement, manifold pressure, carburetor throat size, etc.

The precise portion of a particular charge to a given cylinder which is pre-formed in the manifold during the time that the intake valve to that cylinder is closed under various operating conditions is not constant. However, when one takes into consideration the relationship of the piston displacement to the manifold volume in most engines, the portion of the total charge to a given cylinder which is pre-formed in the manifold would not normally exceed about 70% of the total under normal operating conditions and may be as small as 20% of the total. In a four-cycle engine (consider two cylinders with mid located caburetor for example) the intake valve to a given cylinder is closed about 72% of the time. Since the rate of flow of air entering the manifold at opening 226 is essentially constant at a given engine operating condition, the size of opening 226 is selected such that 72% of the air entering the manifold through that opening during a given engine cycle is sufficient to fill about 7–20% of the manifold that contains the pre-formed part of the charge. Experiments show that such volume of air entering at opening 226 will result in increase of the average manifold pressure by about 2 inches Hg and an increase in air/fuel ratio of the total charge by about 20%. It should, of course, be noted that during 28% of the engine cycle (intake valve open), air entering the manifold at opening 226 somewhat dilutes that portion of the charge which was not pre-formed in the manifold and is a relatively rich fuel/air mixture compared to the pre-formed charge.

At the completion of the intake stroke of a given cylinder when the intake valve closes, that part of the manifold which will contain the pre-formed part of the next charge will be a relatively rich fuel/air mixture, however during the remaining 72% of the cycle, air entering at opening 226 and properly directed by holes 228 to create a curtain of air will compress a portion of that rich fuel/air mixture toward the intake valve and another portion toward the carburetor thereby creating a pocket of relatively lean mixture in that part of the manifold where a portion of the charge is pre-formed.

When the intake valve 206 opens and the piston 204 performs its intake stroke, the stratified charge created with the aid of auxiliary air intake devices 222, 224 as described above, is delivered to the cylinder 202 forming (1) a relatively rich fuel/air mixture layer adjacent the face of piston 204, (2) a middle relatively lean fuel/air mixture layer, and (3) another relatively rich fuel/air mixture adjacent the spark plug 220. During the compression stroke of the piston 204 the layered or stratified charge in the cylinder 202 essentially maintains its stratified characteristics with reduced volume.

Ambient air may enter directly at 226 but preferably the air is first passed through a conventional type air filter.

Although, theoretically, the size of the opening at 226 should be varied in proportion to the amount of fuel/air mixture entering the manifold from the carburetor, experience shows that the size of the opening at 226 can be fixed. When the size of the opening at 226 is fixed, the volume of the midlayer of relatively lean fuel/air mixture in the manifold will vary with operating conditions of the engine. By properly selecting a particular size of opening at 226, the effect of the variation in volume of the mid-layer with engine operating conditions will not seriously impact stratified charge advantages in normal engine use.

In multi-cylinder engines the sequence is the same but the timing sequence alters the times involved.

The piston 204 preferably is provided with a circumferential groove 232, similar in construction to the conventional piston ring groove, which is provided with a plurality of holes 332 forming cavities. During the compression stroke, those cavities are filled with a part of the charge but because those cavities are relatively cool the charge portions stored therein do not burn. During later portion of the expansion stroke and during the early portion of the exhaust stroke the portions of the charge stored in the cavities are at relatively high pressure and the stored portions of the charge escape into the combustion chamber creating turbulance which mixes the products of combustion to aid in further reduction of pollutants.

As shown in FIG. 7, exhaust from cylinder 202, under control of exhaust valve 208, passes through exhaust port 215 and exhaust manifold 212 to an exhaust treating container 230.

Although the stratified charge will minimize nitric oxide pollution in the exhaust, the products of combustion may contain more than the desired amount of unburned hydrocarbons and carbon monoxide. To cause oxidation of those products of combustion, the exhaust treating container 230 serves to "fold back" the exhaust gases upon themselves thus causing the lean and rich portions to be brought together and thereby enhance oxidation of the unburned hydrocarbons and carbon monoxide. Since temperature greatly affects the oxidation process, the exhaust entering the exhaust treating container must be at the proper temperature to promote oxidation.

Although the stratified characteristic of the charge is somewhat altered during combustion and during the power stroke of the engine, the exhaust is still somewhat stratified, i.e., a portion of exhaust rich in oxygen is preceded and followed by portions containing unburned hydrocarbons and carbon monoxide. The "fold back" nature of exhaust treating container 230 causes mixing of the oxygen with the unburned hydrocarbons and carbon monoxide and under proper temperature conditions will result in oxidation of those compounds.

Tests were run at Cornell University using a simulated "EPA Urban Dynamometer Driving Schedule" (see Appendix I of 40CFR85 published in Federal Register, Volume 37, No. 211, 11/15/72). A conventional 1971 American Motors Matador with a 232 cu. in. 6 cylinder stock engine without the above described pollution controls is reported to emit 3.08 grams/mile hydrocarbons, 25.97 grams/mile carbon monoxide and 3.23 grams/mile $NO_x$ or nitric oxides. Best results to date at Cornell using the same test procedure and using the aforedescribed pollution control devices illustrated in FIG. 7, resulted in hydrocarbons 0.3 grams/mile, carbon monoxide 3 grams/mile and nitric oxides ($NO_x$) 1.15 grams/mile.

In each of the embodiments discussed above, other engine modifications affected by the pre-stratified charge operation of the present invention, such as optimum spark advance, valve timing, valve overlap and the like, should be adjusted accordingly.

The pre-stratification when used with the cavity type plugs is effective for $NO_x$ control. If the fuel/air mixture near the spark plugs is rich the plugs operate so as to reduce the $NO_x$ as discussed in Resler copending application Ser. No. 449,391. If one chooses to use a stratified layer near the plug, lean but ignitable, then not much $NO_x$ is produced because of the low temperature. In this case, the plugs are effective to reduce $NO_x$ during engine accelerations when the carburetor, due to functioning of its accelerator pump, temporarily renders the fuel/air mixture rich for more power. It is not necessary to use cavity type plugs when the $NO_x$ is reduced by lowering the combustion temperature. The pre-stratification control is so effective that the use of it is often all that is required.

The stratification techniques as taught above can be applied to rotary engine applications and two cycle reciprocating engines. The flexibility of the stratification profile of the intake manifold permits adoption of the pre-stratification techniques as described above to rotary engine configurations including the Wankel type. The basic teaching of the present application is the use of the intake manifold to create through a precharge the desired stratification profile. Such is accomplished by bringing supplementary air within the intake manifold (associated with a closed intake valve) via one or more streams flowing over different through paths outside the flow of carbureted fuel/air mixture and such is accomplished by a pressure priority relation created for this purpose.

Moreover, in all applications the use of pre-stratification raises the intake manifold pressure and a significant fuel savings is achieved due to the reduction of pumping losses.

While in accordance with the provisions of the Patent Statutes the preferred form and embodiments of the invention have been disclosed, it will be apparent that changes may be made in the disclosed apparatus without deviating from the inventive concepts disclosed herein.

What is claimed is:

1. In an internal combustion engine having at least one cylinder with a power member and intake and outlet valves; a source of fuel-air mixture; means including a fuel-air throttle valve and an intake manifold for supplying said fuel-air mixture to said cylinder via said intake valve; and an exhaust manifold for removing exhaust gases from said cylinder via said exhaust valve;

The improvement which comprises pre-stratifying charge means including a source of air at pressure greater than the pressure in said intake manifold connected to said intake manifold through a flow control orifice having a cross sectional area of such dimensions that the quantity of air entering said intake manifold between said intake valve and said fuel-air throttle valve causes an increase of manifold pressure by about 30% and the quantity of air entering said manifold through said orifice is sufficient to fill an appropriate volume of the manifold between said intake valve and said fuel-air throttle valve thereby creating a pocket of fuel lean air/fuel mixture between said intake valve and said fuel air throttle valve.

2. Apparatus as defined in claim 1 wherein said air enters said manifold adjacent said intake valve.

3. Apparatus as defined in claim 1 wherein said fuel-air throttle is located between said source of air and said air flow control orifice and so oriented that substantially no fuel passes through said orifice.

4. Apparatus as defined in claim 1 wherein said air enters said manifold at a point substantially midway between said intake valve and said fuel-air throttle valve.

5. An operating internal combustion engine including a working chamber having an intake stroke, an intake valve, a spark plug, a carbureted source of fuel-air mixture with a throttle valve and an intake manifold connected to said carbureted source of fuel-air mixture via said throttle plate for supplying carbureted fuel-air mixture to said working chamber when said intake valve is open;
including the improvement which comprises
pre-stratifying charge means including a source of air at pressure greater than the pressure in said intake manifold connected to said intake manifold through a flow control orifice having a cross-sectional area of such dimensions that the quantity of air entering said intake manifold between said intake valve and said fuel-air throttle valve causes an increase of manifold pressure by about 30% and the quantity of air entering said manifold through said orifice is sufficient to fill an appropriate volume of the manifold between said intake valve and said fuel-air throttle valve thereby creating a pocket of fuel lean air/fuel mixture between said intake valve and said fuel air throttle valve.

6. Apparatus as defined in claim 5 wherein the pressure differential between the pressure of the air from said source of air and the pressure of the gases in said intake manifold cause said air to pass through said orifice and the cross-sectional area of said orifice is of such size that the air-fuel ratio of the total charge delivered to said working chamber is about 20% greater than the air-fuel ratio of the mixture from said carbureted source of fuel-air mixture.

* * * * *